United States Patent [19]
Medlin

[11] Patent Number: 4,718,046
[45] Date of Patent: Jan. 5, 1988

[54] METHOD FOR DRIVING A BENDER-TYPE TRANSMITTER OF A BOREHOLE LOGGING TOOL TO SEQUENTIALLY PRODUCE ACOUSTIC COMPRESSIONAL AND TUBE WAVES

[75] Inventor: William L. Medlin, Dallas, Tex.

[73] Assignee: Mobil Oil Corporation, New York, N.Y.

[21] Appl. No.: 800,924

[22] Filed: Nov. 22, 1985

[51] Int. Cl.[4] .................... G01V 1/40
[52] U.S. Cl. .................... 367/31; 367/32
[58] Field of Search .................... 367/31, 32, 25, 49, 367/75; 181/106

[56] References Cited

U.S. PATENT DOCUMENTS

| | | | |
|---|---|---|---|
| Re. 24,446 | 3/1958 | Summers | 181/0.5 |
| 3,191,145 | 6/1965 | Summers | 340/18 |
| 3,333,238 | 7/1967 | Caldwell | 340/18 |
| 3,362,011 | 1/1968 | Zemanek, Jr. | 340/18 |
| 4,312,049 | 1/1982 | Masse et al. | 367/32 |
| 4,328,567 | 5/1982 | Dodge | 367/32 |
| 4,383,308 | 5/1983 | Caldwell | 367/31 |
| 4,450,540 | 5/1984 | Mallett | 367/32 |
| 4,606,014 | 8/1986 | Winbow et al. | 367/75 |

FOREIGN PATENT DOCUMENTS 1152201 8/1983 Canada .

OTHER PUBLICATIONS

"Some Effects of Frequency Upon the Character of Acoustic Log," Chaney et al., Journ. of Petrol. Tech., 4/66, pp. 407–411.

"Theoretical Seismic Wave Radiation from a Fluid--Filled Borehole," Lee et al., Geophysics, vol. 47, #9, 9/82, p. 1308.

C. A. Sheridan, et al., "Bender Bar Transducers for Low-Frequency Underwater Sound Sources," presented at 97th Meeting of the Acoustical Society of America, Cambridge, Massachusetts, Jun. 15, 1979.

*Primary Examiner*—Thomas H. Tarcza
*Assistant Examiner*—Ian J. Lobo
*Attorney, Agent, or Firm*—Alexander J. McKillop; Michael G. Gilman; George W. Hager, Jr.

[57] ABSTRACT

An acoustic well logging system employs a sine wave tone burst generator which drives a bender-type transmitter in a borehole logging tool to sequentially produce acoustic compressional and tube waves. A sine wave tone burst is selectively swept or fixed in frequency between 10 kHz and 1.5 kHz to generate a constant frequency compressional wave and below 1.5 kHz to generate a constant frequency tube wave. The constant frequency of the compressional wave along a particular subsurface formation interval is characteristic of the rock material of such subsurface formation interval.

2 Claims, 9 Drawing Figures

COMPRESSIONAL / TUBE WAVE GENERATION

METHOD FOR DRIVING A BENDER-TYPE TRANSMITTER OF A BOREHOLE LOGGING TOOL TO SEQUENTIALLY PRODUCE ACOUSTIC COMPRESSIONAL AND TUBE WAVES

BACKGROUND OF THE INVENTION

It has long been known to acoustically log open wellbores to determine the velocities of compressional ("P") waves, shear ("S") waves, and tube ("T") waves traveling through rock formations located in the wellbore region. Logging devices have been used for this purpose which normally comprise a sound source (transmitter) and one or more receivers disposed at preselected distances from the sound source.

By timing the travel of compressional waves, shear waves, and/or tube waves between the transmitter and each receiver, it is normally possible to determine the nature of surrounding rock formations. In logging loosely consolidated formations, however, it is often difficult to distinguish between compressional, shear, tube and secondary waves which may comprise portions of a wave train arriving at a given receiver. The use of remotely spaced, multiple receivers is thus intended to aid in distinguishing between arriving wave fronts and from noise in the system. Multiple receivers permit the recognition of similar wave patterns and wave fronts which are received at each successive receiver. Since travel time differences increase with increasing distance from the transmitter source, wave fronts and patterns which are closely spaced at proximate receiver locations will separate by the time of their receipt at remote receiver locations.

Various signal timing and wave front analysis methods have also been suggested for distinguishing between wave fronts received at a given receiver. Most of these methods involve timing circuits which anticipate the receipt of, and facilitate the collection of, such wave front information. For descriptions of various logging techniques for collecting and analyzing compressional wave, shear wave, tube wave, and secondary wave data, please refer to U.S. Pat. Nos. 3,333,238 (Caldwell), 3,362,011 (Zemanek, Jr.), U.S. Pat. No. Re. 24,446 (Summers), and U.S. Pat. No. 4,383,308 (Caldwell).

In the design of logging tools, various types of transmitters, such as piezoelectric or magnetostrictive transmitters, have been suggested for creating acoustic logging signals. For conventional logging operations, most such transmitters have been centrally located in the borehole and have been adapted to generate sound which is radiated in a multidirectional (360°) pattern from the transmitter to adjacent wellbore surfaces. Such transmitters are well suited for creating compressional waves in surrounding rock and sand formations.

Since compressional waves travel faster than those shear, tube or secondary waves which may also be produced by a multidirectional transmitter, calculation of compressional wave velocity is accomplished by presuming that the first arriving wave front or wave pattern is that of a compressional wave. In loosely consolidated formations, subsequent arrivals of shear waves, tube waves and/or secondary waves are difficult to distinguish. In such formations, multidirectional transmitters tend to generate compressional waves of much greater amplitudes than any shear waves also produced thereby. Recognition of shear wave arrivals is thus particularly difficult.

Recently, attention has been directed to developing transmitters which are particularly suited to a single point force application of acoustic energy to the borehole wall. The theory behind point force transmitters is that they produce an asymmetrical acoustic energy radiation pattern as contrasted with the multidirectional radiation pattern. One such point force transmitter is the bender-type disclosed in Canadian Pat. No. 1,152,201 (Angona and Zemanek).

SUMMARY OF THE INVENTION

In accordance with the present invention, a borehole logging tool comprises an acoustic transmitter of the bender-type having unrestricted piezoelectric planar surfaces oriented along the longitudinal axis of the tool. The transmitter is exposed to a coupling liquid within the tool. Sine wave tone bursts excite the transmitter to generate acoustic energy waves having a dominant mode of vibration. The frequency of the tone bursts is varied as the logging tool traverses each subsurface formation interval of interest to produce both a compressional wave and a tube wave in each of the subsurface formation intervals of interest.

In one embodiment, the frequency of the tone burst is swept between about 10 kHz and 1.5 kHz so as to generate a constant frequency compressional wave and is swept between about 1.5 kHz and a few hundred Hz so as to generate a variable frequency tube wave of about the same frequency. In an alternate embodiment the frequency of the tone burst is swept between about 10 kHz and 1.5 kHz so as to generate a constant frequency compressional wave and is maintained fixed between about 1.5 kHz and a few hundred Hz so as to generate a constant frequency tube wave of about the same frequency. In a yet further embodiment, the frequency of the tone burst is maintained fixed between about 10 kHz and 1.5 kHz so as to generate a constant frequency compressional wave and is maintained fixed between about 1.5 kHz and a few hundred Hz so as to generate a constant frequency tube wave.

DESCRIPTION OF THE PREFERRED EMBODIMENT

Figure 1:
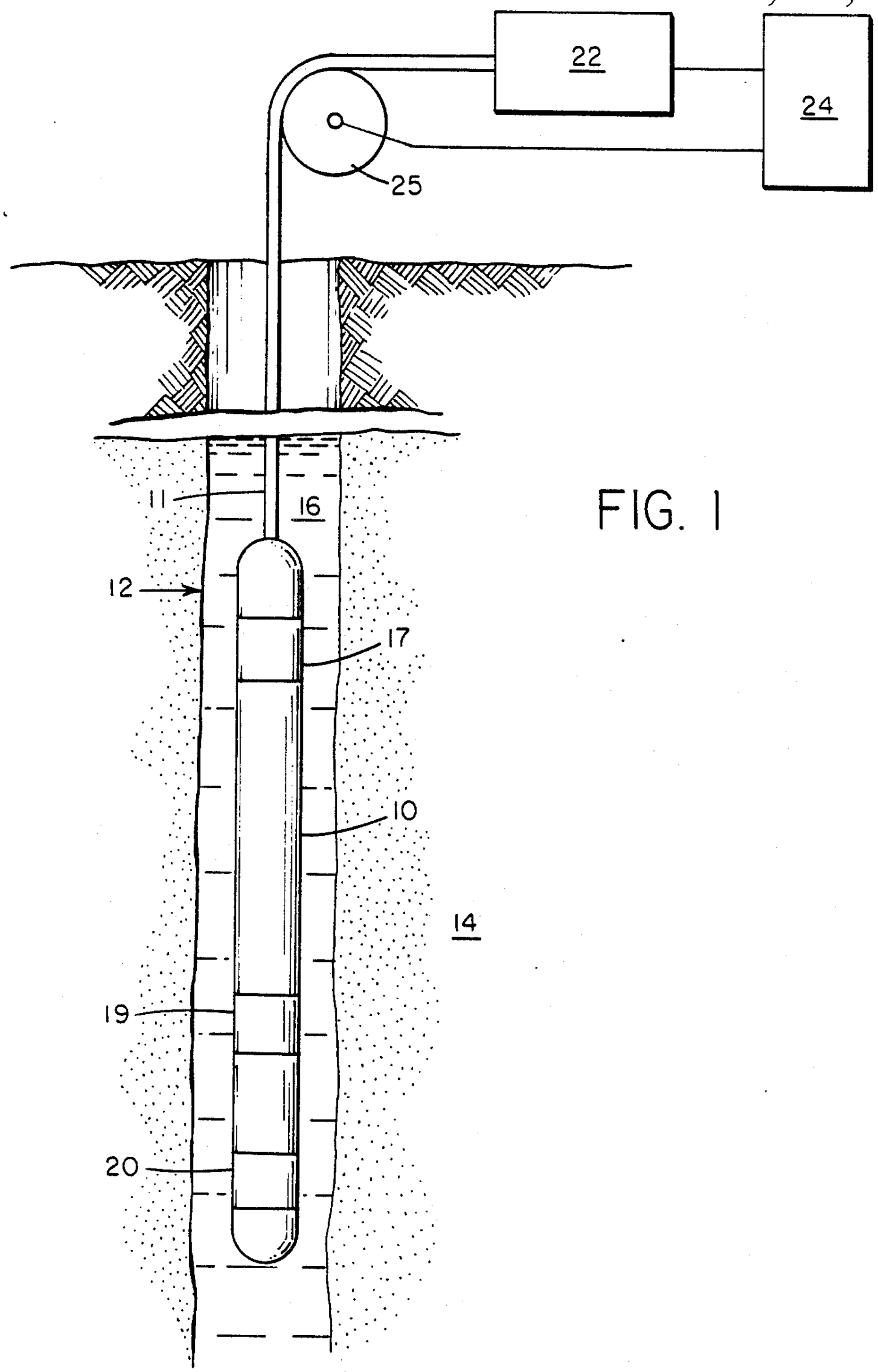
FIG. 1 is a schematic illustration of an acoustic borehole logging system embodying the present invention.

Referring now to FIG. 1, there is illustrated an acoustic borehole logging system employed in carrying out the method of the present invention.

The logging system includes an elongated logging tool 10 which is suspended from a cable 11 within a borehole 12 which traverses a subterranean formation of interest indicated by reference character 14. Formation 14 may be a suspected oil- or gas-bearing formation which is to be characterized in regard to its porosity, fluid saturation, or such other information as may be desired. The well 12 is filled with a liquid, such as drilling mud indicated by reference numeral 16. The logging tool 10 comprises an acoustic transmitter 17 and acoustic receivers 19 and 20. Transmitter 17 and, preferably also receivers 19 and 20, take the form of bender-type transducers, as described in greater detail hereinafter.

Signals from the logging tool 10 are transmitted uphole by the conductors in cable 11 to any suitable utilization system at the surface. For example, the utilization system is illustrated as comprising an uphole analysis and control circuit 22 and recorder 24 in order that the output from circuit 22 may be correlated with depth.

The logging system may be operated in a manner to measure one or more parameters ascertainable with acoustic well logging systems. For example, the system may be operated in a velocity and/or amplitude logging mode as described previously. The transmitter and receivers are controlled through suitable timing circuitry located either uphole, or in the logging tool itself. Typically, the control circuitry will comprise a time base generator which operates to produce pulses to excite transmitter 17 and which gates receivers 19 and 20. Receivers 19 and 20 may be gated alternately in order to prevent cross-feed within the cable 11, as will be readily recognized by those skilled in the art. For example, receiver 19 may be gated on during an interval of from 0.5 to 30 milliseconds subsequent to a first acoustic pulse from transmitter 17. Receiver 19 is then gated off, and after the next succeeding pulse from transmitter 17, receiver 20 gated on. For example, receiver 20 may be gated on during a similar interval from 0.5 to 30 milliseconds subsequent to the transmitter output pulse. The logging tool may be moved through the well at any suitable rate while it is operated to generate and receive the acoustic pulses. Typically, the tool will be lowered to the bottom of the interval to be logged and then pulled upwardly during the logging measurements at a speed of at least 20 feet per minute. Somewhat greater logging speeds, e.g., 60 feet per minute, normally can be used.

At the surface, the uphole circuitry operates on the signals from receiver 19 and 20 to produce signals representative of the travel time between receivers 19 and 20 and the difference in amplitude between the acoustic signals detected by receivers 19 and 20. The circuitry employed for determining the time interval between the acoustic signal arrival at receivers at 19 and 20 may be of any suitable type. For example, the pulses employed to trigger the transmitter may also be applied to a ramp function generator to initiate a signal which increases monotonically with time. For example, the ramp function generator may respond to a triggering pulse to generate a voltage which increases linearly with time. Thus, the amplitude of the voltage is directly proportional to the time following generation of the acoustic signal by transmitter 17. The output from the ramp function generator is applied through gates controlled by the outputs from receivers 19 and 20 to respective voltage storage means. Thus, when an acoustic signal is received at receiver 19, the resulting transducer voltage is applied to open one gate to pass the voltage from the ramp function generator to a first storage means. When the next signal is received by receiver 20, the transducer signal is applied to open another gate to pass the output from the ramp function generator to a second storage means. The two voltage signals are then applied to a different circuit, the output of which is recorded in correlation with depth to provide a travel time log. The amplitude parameter may similarly be determined through the use of any suitable circuitry. For example, the peak voltage outputs from receivers 19 and 20 may be applied to a difference circuit which produces a voltage which is representative of the difference in the maximum amplitudes of the acoustic signals received by receivers 19 and 20. The output from this difference circuit is then recorded to provide a log of attenuation within the formation. Such analysis and control circuitry is well known to those skilled in the art, and for a further description thereof, reference is made to U.S. Pat. No. 3,191,145 to Summers, which is incorporated herein by reference. Also, while two receivers are shown, it will also be recognized that the logging tool may be equipped with only one receiver in which case a measured parameter may be the travel time between transmitter 17 and the receiver. Preferably, however, two receivers, as shown, will be employed in order to avoid distortion of the measured values due to borehole effects, such as changes in the borehole diameter. Typically, the first receiver 19 is spaced about 5 to 15 feet from the transmitter with a spacing between adjacent receivers 19 to 20 of about 2 to 5 feet.

Figures 2, 4:
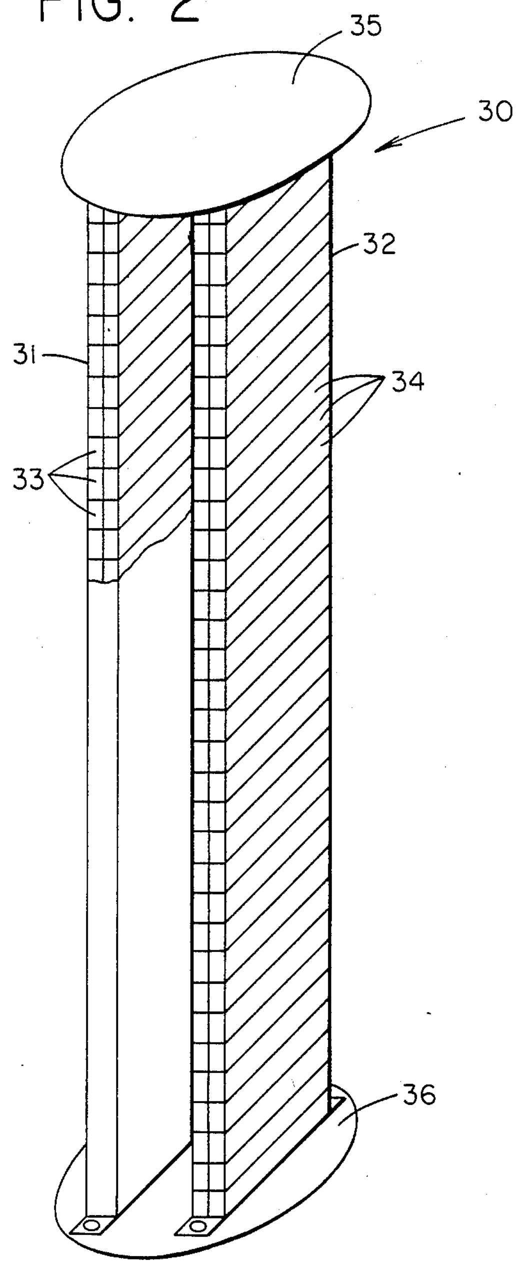
FIGS. 2 and 3 illustrate the configuration and action, respectively, of the transmitter section of the acoustic borehole logging system of FIG. 1.
FIG. 4 is a diagrammatic illustration of the use of the transmitter section of FIG. 1 in generating compressional and tube waves.

As noted previously, acoustic pulses are produced in accordance with the present invention by means of a bender-type transducer. Bender-type transducers are, in themselves, well known and take the form described by Sheridan, C. A., et al., in "Bender Bar Transducers For Low-Frequency Underwater Sound Sources", presented at the 97th Meeting of the Acoustical Society of America, Cambridge, Mass., June 15, 1979. Such a transducer is available commercially from Honeywell Defense Electronics Division, Seattle, Wash., Aug. 20, 1979, as models HT-29-L and HX-8B. Turning now to FIG. 2, there is illustrated an enlarged view of a bender-type transducer utilized as the transmitter 17 of FIG. 1. Such a transducer 30 comprises a pair of benders bars 31 and 32. Bar 31 is comprised of a mosaic configuration of smaller individual bars 33 and bar 32 is similarly comprised of a plurality of individual bars 34. The two bars 31 and 32 are mounted between common support members 35 and 36. This type construction permits the bars to be driven at a plurality of frequencies to give a good quality sine wave output as compared to the larger plate-type bdnder transducers.

Figure 3:
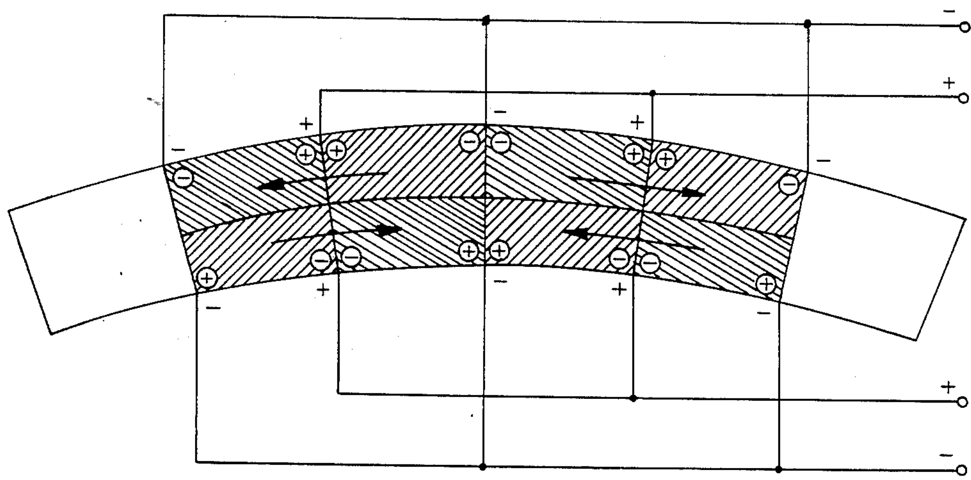

The benders principles of the bender-type transducer are shown in detail in FIG. 3. The bending action of bars 31 and 32 arises from the direction of polarization of each individual bar 33 and 34 with respect to adjacent bars 33 and 34, as indicated by the arrows. As shown diagrammatically in FIG. 4, the two piezoelectric elements flex outward and inward together to produce a compressional and/or tube wave in the wellbore. Such a bender-type transmitter is designed to have a number of characteristic resonant frequencies between a few hundred Hz and several kHz, such as from about 100 Hz to about 50 kHz. In response to the application of a single polarized electric field, the transmitter will resonate at a single one of such characteristic resonant frequencies.

In carrying out the method of the present invention, the bender-type transmitter is driven by a sine wave tone burst rather than the conventional signal impulse. This tone burst is a sine wave driving current with a duration of one or more cycles. Commercial devices are available for generating tone bursts, such as a Model 7060 Generator, supplied by Exact Electronics, Hillsboror, Oreg., with a Model MC 2500 Power Amplifier, supplied by McIntosh Laboratory, Binghamton, N.Y. Amplitudes are in the range of 100–150 volts RMS. This voltage is sufficient for generating acoustic source levels from the transmitter which will provide detectable acoustic signals in conventional long-spaced, bender-type receivers in borehole logging tools.

Too long a tone burst will create cross-talk problems between the various logging cables leading to the transmitter and receivers. To avoid such an interference during logging operations, cross-talk must cease before the earliest signal arrives at the nearest receiver. The duration of the tone burst per cycle increases with decreasing frequency. However, the amplitude of the cross-talk signal falls off significantly as frequency decreases. Under borehole operating conditions, the fastest acoustic wave energy from the transmitter begins arriving at receivers in as little as three milliseconds following initiation of transmitter source vibrations. Therefore, to avoid cross-talk interference at frequencies above 1 kHz, each tone burst duraction should not exceed, preferably, five cycles. To be effective under these conditions, the transmitter should have a Q no greater than ten.

It is yet a further aspect of the invention to control the frequency of the tone burst or driving frequency to the transmitter. It has been found that the vibrational mode generated in the borehole is controlled by the transmitter frequency. The dominant mode of vibration observed in one acoustic logging operation employing a Honeywell HX8-B bender-type transducer, energized as shown in FIG. 4, and with a single receiver spaced 15 feet from the transmitter was a tube wave below about 1.5 kHz, a compressional wave above about 1.5 kHz, and both a tube wave and a compressional wave above about 10 kHz. The generation of a tube wave at frequencies above 10 kHz is due to the presence of low frequency components in the transmitter response which excite the tube waves. This is more fully illustrated in the following TABLE:

TABLE

| Transmitter Freq. (kHz) | Compressional Wave Freq. (kHz) | Tube Wave Freq. (kHz) |
|---|---|---|
| 0.4 | — | 0.4 |
| 0.5 | — | 0.5 |
| 1.0 | — | 1.0 |
| 1.5 | — | 1.2 |
| 3.6 | 3.3 | — |
| 5.9 | 3.3 | — |
| 8.5 | 3.5 | — |
| 10.0 | 3.4 | 1.1 |
| 12.5 | 3.7 | 1.0 |
| 15.5 | 3.6 | — |
| 30.0 | 3.5 | — |

It can be seen from the TABLE that the tube wave frequency is about equal to the driving frequency of the transmitter below about 1.5 kHz. The compressional wave frequency remains nearly constant at a characteristic frequency, or some harmonic, such as the 3.3 to 3.5 kHz illustrated in the example of the above TABLE, for all driving frequencies from 3.6 kHz to 30 kHz.

Even though the compressional wave is shown to remain constant in Table I over the frequency range of 1.5 kHz to 10 kHz where such waveform is dominant, this holds only for a single subsurface formation. For differing formations, this constant compressional wave frequency can carry over a range of several kHz. Each such formation can be characterized by its own unique constant compressional wave frequency. This characteristic can be measured and utilized to identify changes in formation properties, such as lithology, porosity, saturation, etc. Such characteristic can, therefore, be regarded as a fundamental quantity in the same sense as compressional wave velocity. It is, therefore, a specific feature of the present invention to measure the various constant compressional wave frequencies along the length of a borehole so that individual wellbore intervals can be identified and their rock properties and reservoir characteristics determined.

Figure 5:
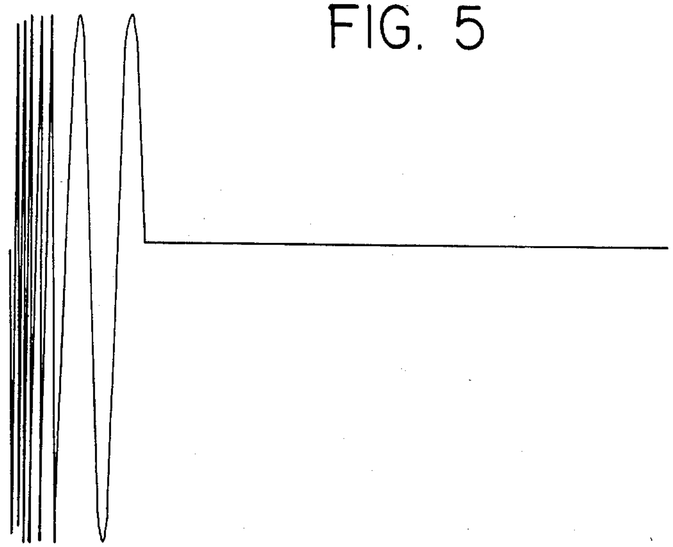
FIGS. 5, 7 and 8 illustrate various sine wave tone bursts utilized to energize the transmitter section of FIG. 1 in generating compressional and tube waves.
Figure 6:
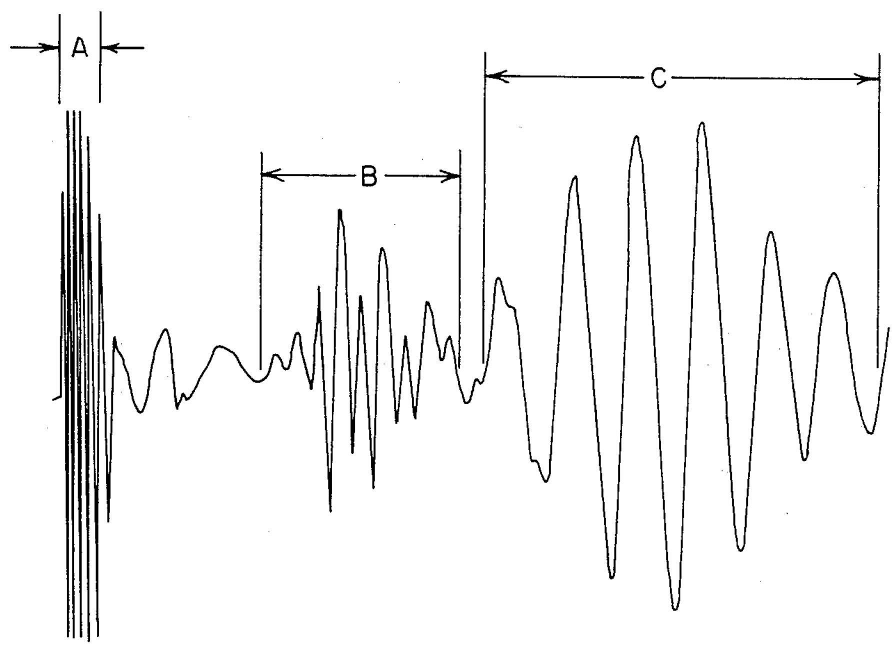
FIG. 6 illustrates the compressional and tube waves received by the receiver section of FIG. 1 in response to the sine wave tone burst of FIG. 5.

Running a large suite of logs, each at a fixed tone burst frequency, will not be practical or efficient. A more practical method is to run a single log in which the transmitter is driven by a swept frequency tone burst. An example of such a swept frequency tone burst is shown in FIG. 5. Frequency is varied so as to decrease linearly with time, preferably starting at about 10 kHz and terminating at about a few hundred Hz. FIG. 6 illustrates the acoustic waveform received by a conventional ceramic detector spaced 15 feet from a Honeywell HX-8B bender-type transmitter driven by the tone burst of FIG. 5. The early portion of the transmitter burst above about 1.5 kHz produces a compressional wave at the receiver, as identified by the region B in FIG. 6. The later portion on the transmitter burst below about 1.5 kHz produces a tube wave at the receiver, as identified by the region C in FIG. 6. The compressional wave, being of higher frequency, arrives well ahead of the tube wave. Because of these timing effects, the compressional and tube waves are separated and free of interference effects. Region A in FIG. 6 represents cross-talk.

The received compressional wave portion of FIG. 6 is of a different constant frequency for each subsurface formation interval and can be easily measured from the log data. The received tube wave is well resolved, as seen in FIG. 6, and provides good velocity and amplitude data. The first arrival of the tube wave is well defined. Therefore, the conventional method of timing first arrivals at a pair of receivers will be effective in measuring velocity. Since this tube wave is of decreasing frequency, correlation methods can be used effectively on the waveforms obtained at a pair of receivers.

Figure 7:
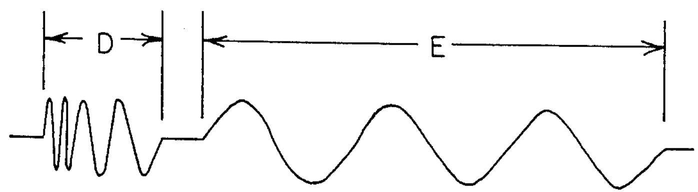

However, in some borehole applications, a variable frequency tube wave is undesirable. In such a case, the driving tone burst of FIG. 7 can be successfully utilized. Here, the transmitter tone burst consists of a frequency sweep from about 10 kHz to 1.5 kHz followed by a fixed frequency below about 1.5 kHz, as identified by regions D and E, repsectively, in FIG. 7. Preferably, these sweep and fixed frequency portions of the tone burst are slightly separated in time, as shown in FIG. 7. With this alternate method of energizing the transmitter, the constant frequency characteristic of each subsurface formation interval is still preserved on the log data. The compressional and tube waves are again well isolated, but the received tube wave is now of constant frequency.

Figure 8:
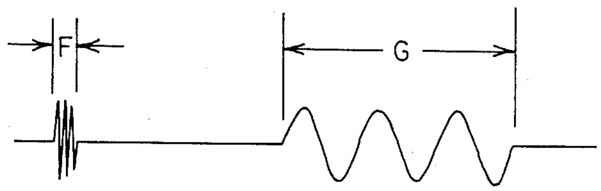
Figure 9:
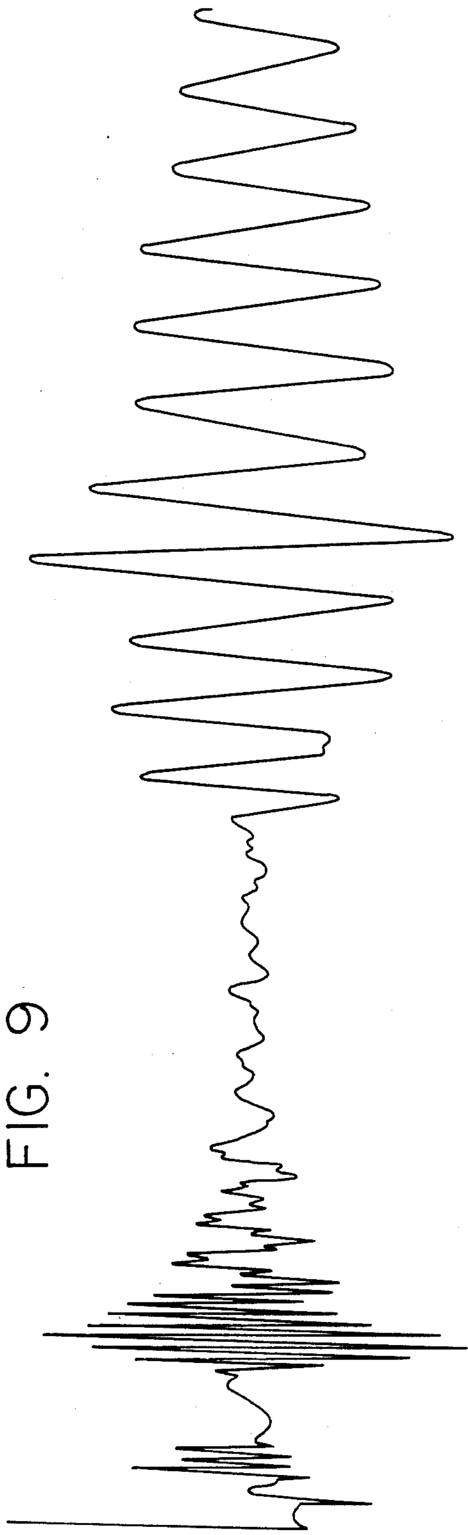
FIG. 9 illustrates the compressional and tube waves received by the receiver section of FIG. 1 in response to the sine wave tone burst of FIG. 8.

A yet further alternate method for energizing the transmitter is shown in FIG. 8. Here, the tone burst consists of a fixed frequency between about 10 kHz to 1.5 kHz followed by a fixed frequency below about 1.5 kHz, as identified by regons F and G in FIG. 8. Preferably, these different fixed frequency portions of the tone burst are slightly separated in time, as shown in FIG. 8. These alternate methods, with as large a time separation as possible between regions D and E in FIG. 7 and regions F and G in FIG. 8, such as several milliseconds, provide maximum isolation of the compressional wave and tube waves at the receivers.

It is to be understood that while preferred embodiments of the invention have been described and illustrated, numerous modifications or alterations may be made without departing from the spirit and scope of the invention as set forth in the appended claims.

I claim:

1. An acoustic well logging method, comprising the steps of:

(a) traversing a borehole with a well logging tool containing a coupling liquid and an acoustic transmitter of the bender-type having unrestricted piezoelectric planar surfaces oriented along the longitudinal axis of said tool which are exposed to said coupling liquid, (b) exciting said transmitter with a first sine wave tone burst that is swept between about 10 kHz and 1.5 kHz so as to generate a constant frequency compressional wave and (c) exciting said transmitter with a second sine wave tone burst that is swept between about 1.5 kHz and a few hundred Hz so as to generate a variable frequency tube wave of about the same frequency as said tone burst.

2. The method of claim 1 wherein said tone burst consists of a sine wave driving current of no more than five cycles to thereby avoid cross-talk interference between the various logging cables of the logging tool.

* * * * *